United States Patent [19]

Rose et al.

[11] Patent Number: 5,750,169
[45] Date of Patent: May 12, 1998

[54] METHOD AND APPARATUS FOR DIVIDING BAKER'S DOUGH INTO DOUGH BALLS

[75] Inventors: Jackie Lee Rose, Kathleen, Fla.; Sterrett P. Campbell, Atlanta, Ga.

[73] Assignee: Southern Bakeries, Inc., Orangeburg, S.C.

[21] Appl. No.: 840,505

[22] Filed: Apr. 21, 1997

Related U.S. Application Data

[60] Provisional application No. 60/031,013 Nov. 15, 1996.
[51] Int. Cl.$^6$ ................................ A21C 9/00; A21D 6/00
[52] U.S. Cl. .................... 426/231; 425/145; 425/311; 425/333; 426/503; 426/518
[58] Field of Search ........................... 426/503, 504, 426/496, 516, 517, 518, 231; 425/202, 204, 208, 311, 332, 333, 145; 366/85, 86

[56] References Cited

U.S. PATENT DOCUMENTS

| 4,668,174 | 5/1987 | Williams | 426/503 |
| 5,110,610 | 5/1992 | Cummins | 426/503 |
| 5,270,070 | 12/1993 | Campbell | 426/503 |
| 5,283,074 | 2/1994 | Campbell | 426/503 |
| 5,356,652 | 10/1994 | Campbell | 426/503 |

*Primary Examiner*—George Yeung
*Attorney, Agent, or Firm*—Thomas, Kayden, Horstemeyer & Risley

[57] ABSTRACT

A mass of baker's dough is delivered from hopper (28) through stuffing pump (30), developer (38), branch conduits (42-44), through metering pumps (46-48), to dough divider (55), where the streams of dough are divided into dough balls which drop to a rounder bar conveyor (60). The columns of dough are independently maintained from the dough divider (55) to the sheeter-molder-panner (24-26).

8 Claims, 3 Drawing Sheets

METHOD AND APPARATUS FOR DIVIDING BAKER'S DOUGH INTO DOUGH BALLS

This application claims the benefit of U.S. Provisional Application No. 60/031,013, filed Nov. 15, 1996.

FIELD OF THE INVENTION

The invention disclosed herein relates to a dough divider system for separating a mass of baker's dough into separate streams of dough and dividing the streams into dough pieces of equal weight and moving the dough pieces in separate columns for delivery to baking pans and for subsequent proofing and baking procedures.

BACKGROUND OF THE INVENTION

In the processing of baker's dough into loaves of bread or other elongated products, an accepted method of forming the mass of dough into individual dough pieces which are later placed in pans and moved through an oven is to move the dough from a mass of dough with a stuffing pump in a stream of dough through a dough developer, a distributor and several dough conduits to a dough divider. The dough divider continually cuts away the leading ends of the streams of dough into separate dough pieces of substantially equal volume. The dough pieces fall to a rounder bar conveyor where the dough pieces are moved in parallel columns and are rounded into dough balls with developed outer skins. The dough balls are then floured and otherwise processed toward sheeter-molder-panners which form the balls into sheets, roll the sheets into elongated spirals, and drop the elongated dough pieces into pans. The pans are then transported to the oven.

In the above described process, the sheeter-molder-panner operates at a slower rate than the normal operating speed of the other upstream components. For example, a stuffing pump and its dough divider can produce in excess of 200 pieces of dough per minute, with each piece weighing, for example, between one-half and two pounds. In contrast, a typical sheeter-molder-panner handles at a maximum between 80 and 100 pieces of dough per minute.

In order to speed up the operation of a dough processing system, several sheeter-molder-panners can be used with one processing line, with the dough pieces being diverted from a processing line into multiple processing lines moving to multiple sheeter-molder-panners.

With the above described arrangement the dough pieces must be diverted from a single high speed line to slower multiple lines. This requires a precision diverter system that engages and diverts the dough balls laterally into the separate processing lines.

A problem with the above described system is that the step of diverting dough balls from a high speed processing line to the slower lines leading to separate sheeter-molder-panners is that the dough balls tend to stick to the equipment and, therefore, their movement is slowed down somewhat and the dough balls tend to become unevenly spaced from one another, and sometimes the dough balls are odd sizes and they reach the diverter at random times. The result of this is that the dough balls become out of synchronization with the system and the system malfunctions.

Another problem with the above described system is that when dough pieces are continuously processed in multiple columns and one of the columns malfunctions, as when the dough pieces cling to some of the equipment and become out of time and possibly clog the system, it would be desirable to shut down the single line that is malfunctioning while leaving the remaining lines in operation. In the past, this has been impractical because when the operation of one line is shut down, the full production of the divider had to be stopped and the divider and downstream equipment reconfigured to produce fewer loaves and limit their delivery to the remaining operable sheeter/molder/panners. Because once the malfunctioning sheeter/molder/panner was ready to resume production, it would be necessary to again stop and reconfigure the divider and downstream equipment, it is generally not practical to operate at a reduced production rate when one sheeter/molder/panner is stopped for repairs. As a result, the total production capacity of the system is lost for the duration that the machine is shut down.

SUMMARY OF THE INVENTION

Briefly described, the present invention comprises a multiple lane bread divider that functions to maintain dough pieces in separate columns of dough from a multiple port dough divider to the sheeter-molder-panners, with each sheeter-molder-panner receiving one of the columns of dough pieces, which avoids the placement of the dough balls in a single processing line and, more importantly, avoids the requirement of diverting the dough balls from a single processing line into multiple processing lines that feed sheeter-molder-panners.

The dough is pumped by a stuffing pump from a mass of dough through a developer, through a distributor, and through a dough divider. The stuffing pump and developer are of conventional construction, with a typical stuffing pump suitable for this use being disclosed in U.S. Pat. No. 5,283,074. Likewise, dough dividers that sever dough pieces from oncoming streams of dough are also of conventional design, with one such suitable dough divider being shown in U.S. Pat. No. 5,270,070. A system for diverting the dough stream received from the stuffing pump into separate channels leading to the dough divider is disclosed in U.S. Pat. No. 5,356,652. A rounder bar system for developing the dough pieces into dough balls in parallel columns is also disclosed in the last mentioned patent.

An important feature of the invention is that a metering pump is positioned in each conduit leading from the dough developer to the dough divider so as to control the volume of dough moved over a period of time to the dough divider. In the meantime, the dough divider utilizes cut-off blades for each dough conduit that move in unison so that each blade sweeps across the end of a dough conduit so as to cut away the dough that is extruded from the end of the dough conduit. The cut away dough pieces then fall to the rounder bar conveyor system, where the dough pieces from each dough conduit move in a single file column through the subsequent work stations, including through sheeter-molder-panners. The blades of the dough divider move in unison and in constant cycles, with the dough pieces being cut at equal time intervals. The dough pieces of separate columns of dough pieces are weighed so as to determine the proper weight of the dough pieces which enter the sheeter-molder-panners. If the dough pieces of a column are underweight or overweight, the metering pump of the column is adjusted so as to increase or decrease the rate of movement of dough through the dough conduits to the dough divider. For example, if the dough pieces passing through one of the columns of dough pieces toward a sheeter-molder-panner are slightly underweight, its metering pump is adjusted so as to increase the volume of dough passing through the dough conduit to the dough divider. In the meantime, the dough divider simply continues to sever the extruded end portions of the dough streams from the dough conduits at constant time intervals. The adjustment of the metering pump results in more volume and weight of dough being extruded through its discharge port and being cut by the dough divider.

In the meantime, if dough pieces in another column may be detected as being overweight, the metering pump for that column of dough pieces can be adjusted to decrease the volume of dough being moved to the dough divider, so as to correct the weight of the dough balls.

In the event that one of the lines leading to a sheeter-molder-panner should be shut down for maintenance, cleaning or adjustment, the metering pump for the line can be stopped while the other metering pumps continue to operate normally. Any change in the back pressure of the dough from the stuffing pump does not change the volume of dough emerging from the metering pumps of the on-going columns of dough. This provides the operator with the ability to service one or two of the sheeter-molder-panners or other components of the columns of dough without interrupting the operation of the whole system.

The stuffing pump and developer function on a constant pressure, so as to create a back pressure of dough at approximately 40 psi leading to the dough divider, so that the metering pumps receive dough at a predetermined constant pressure.

Since each column of dough balls reaching a sheeter-molder-panner travels separately from the dough divider, the dough divider can operate at a slower speed, no diversion of the dough pieces from a single processing line into multiple processing lines is required and the functions of the intermediate processing equipment between the dough divider and the sheeter-molder-panners can be slowed down so as to avoid misalignment and improper timing of the moving dough balls as might be experienced in a typical high speed dough processing system.

The use of individual metering pumps in the dough conduits instead of the more delicately balanced dough diverters provides more precise control over the volume of dough moved through the dough dividers and provides more reliable volume and weight control of the dough delivered through the system. Further, should one of the columns of dough balls be shut down for maintenance, repair or cleaning, the other lines can be speeded up if desired so as to attempt to maintain the production of the system.

One of the important aspects of the invention is that the metering pumps which control the rate of movement of the dough in the separate streams of dough are positive displacement, constant delivery pumps which deliver a constant volume of the work product throughout the fall cycle of operation of the pump. The use of the constant delivery metering pump assures that the dough being delivered by the metering pump to the dough divider will always be of a constant volume of dough without regard to what portion of the cycle of the pump that the dough is being delivered as the dough divider begins to cut through the stream of dough. For example, with a constant volume being delivered through the full cycle of the dough, there is no surging or pausing of dough delivery to the dough divider which might change the volume of dough being extruded from and cut away by the dough divider, so that every dough piece cut from a dough stream is of equal volume.

Therefore, it is an object of this invention to provide an improved dough divider and processing system for separating a mass of dough into dough pieces of equal weight and transporting the dough pieces in separate columns from a dough divider to sheeter-molder-panners where the dough pieces are shaped and deposited into baking pans.

Another object of this invention is to provide a multiple lane bread divider that accurately and reliably delivers dough pieces in separate columns to separate sheeter-molder-panners.

Another object of this invention is to provide an improved dough delivery system for delivering baker's dough in equal weight dough balls to sheeter-molder-panners, which operates expediently and reliably, with reduced likelihood of malfunction.

Other objects, features and advantages of the present invention will become apparent upon reading the following specification when taken in conjunction with the accompanying drawings.

DETAILED DESCRIPTION

Figure 1:
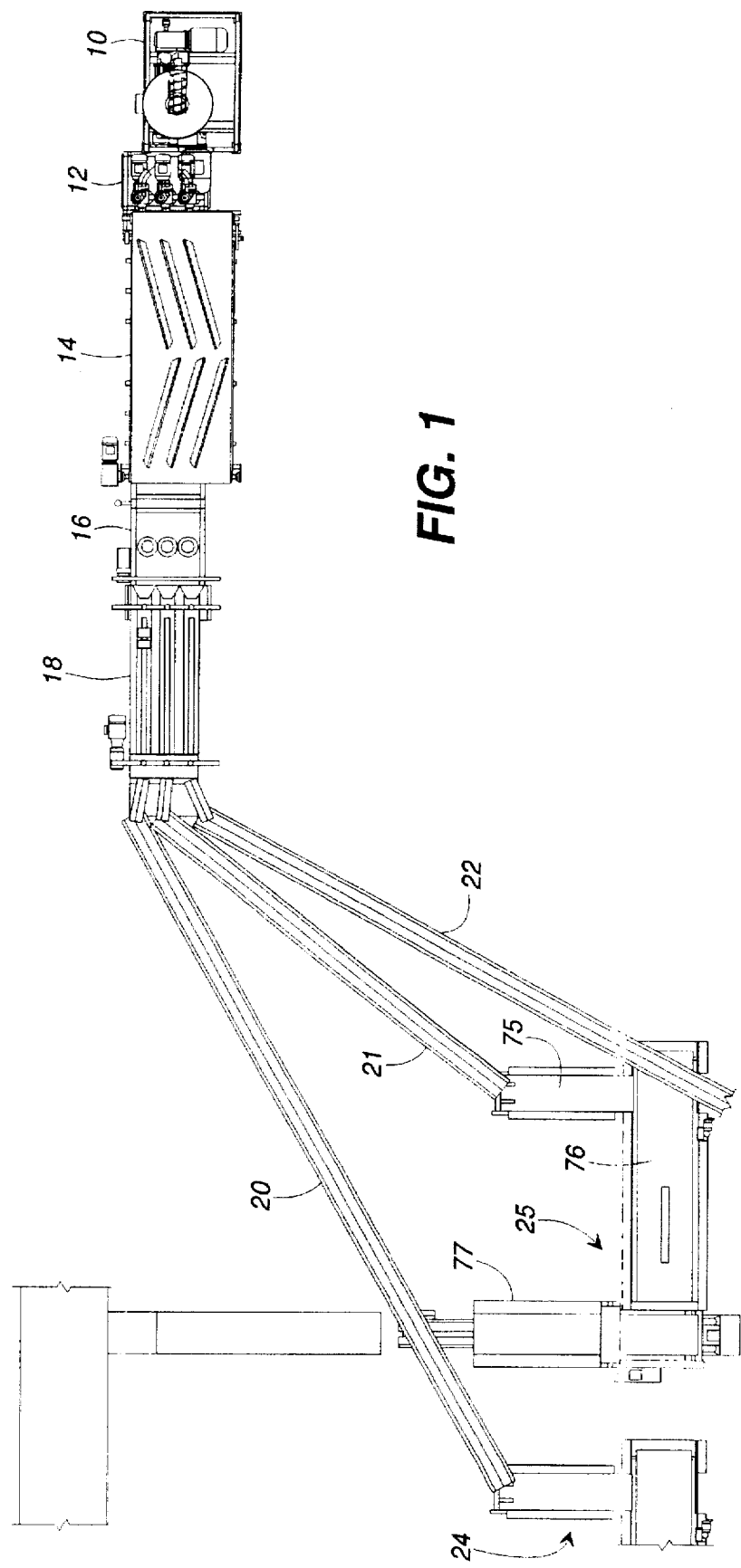
FIG. 1 is a plan view of the Multiple Lane Bread Divider, showing the portion of the system that begins at the stuffing pump and extends through the sheeter-molder-panner.

Referring now in more detail to the drawings, in which like numerals indicate like parts throughout the several views, FIG. 1 illustrates the Multiple Lane Bread Divider which includes a pump module 10, a dough divider module 12, a rounder bar module 14, a flouring module 16, an elevator 18, surface conveyors 20, 21 and 22, and sheeter-molder-panners 24, 25 and 26.

Figure 2:
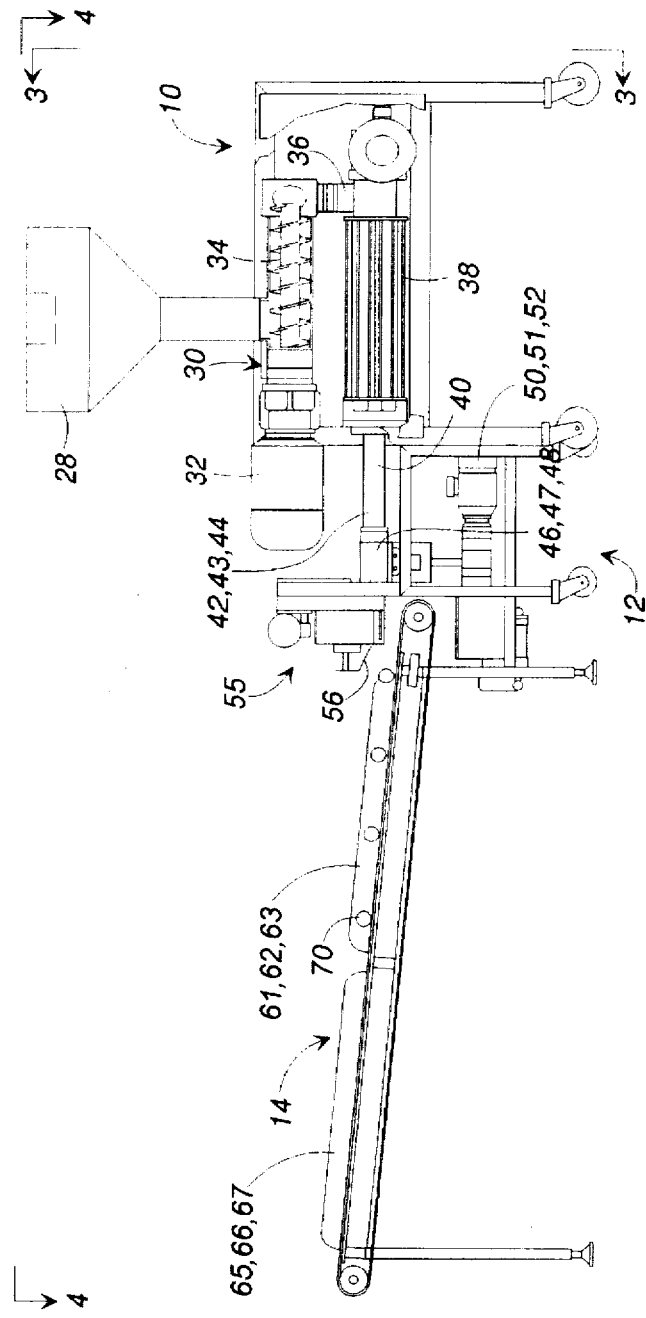
FIG. 2 is a side elevational view of the Multiple Lane Bread Divider, beginning at the stuffing pump and extending through the rounder bar conveyor system.
Figure 4:
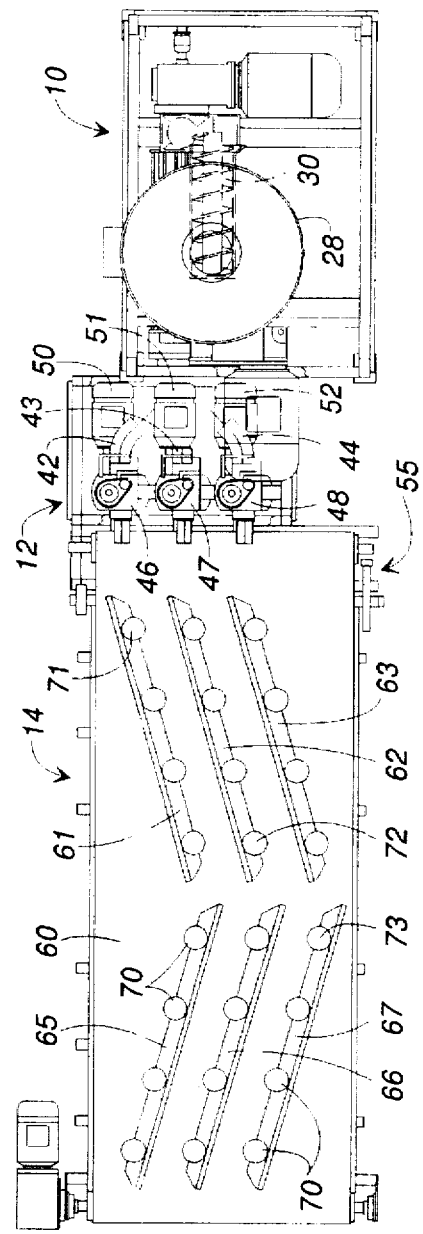
FIG. 4 is a top view of the Multiple Lane Bread Divider, taken along lines 4—4 of FIG. 2.
Figure 3:
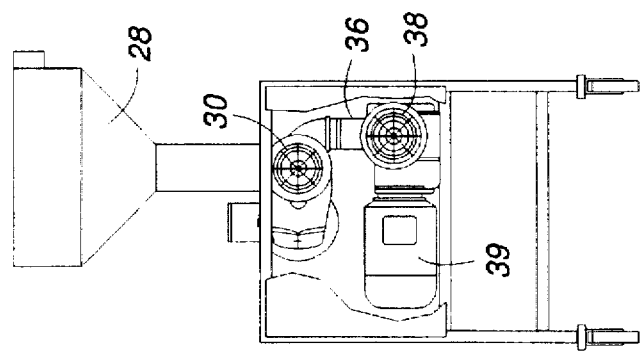
FIG. 3 is an end view of the Multiple Lane Bread Divider, taken along lines 3—3 of FIG. 2.

As illustrated in FIGS. 2, 3 and 4, the pump module 10 includes a hopper 28 for receiving a mass of dough from a dough mixer (not shown), and a stuffing pump 30 positioned beneath and configured to receive dough from the hopper 28. Stuffing pump motor 32 is arranged to rotate the auger 34 of the stuffing pump, so that the dough is urged from left to right through the stuffing pump, and moves through the outlet conduit 36. A stuffing pump of this type is shown in more detail in U.S. Pat. No. 5,283,074.

As shown in FIG. 2, the outlet conduit 36 of stuffing pump 30 communicates with the inlet of dough developer 38 and transfers a stream of dough to the dough developer at approximately 40 psi, and maintains a constant pressure of dough moving through the dough developer. The dough developer is driven by its motor 39 and functions in the conventional manner to stretch the dough so as to develop the gluten of the dough. This is conventional in the art.

The dough is processed from right to left (FIG. 2) through the dough developer 38 and exits the dough developer and the pump module 10 and enters the dough divider module 12, by entering the single dough inlet conduit 40. The single dough inlet conduit 40 branches into multiple dough delivery conduits. In the embodiment illustrated herein, three lines or columns of dough pieces are to be formed. Therefore, the single dough inlet conduit 40 branches into three separate dough delivery conduits 42, 43 and 44 in the dough divider module 12.

As shown in FIG. 4, a metering pump is positioned in each branch delivery conduit 42, 43 and 44. More specifically, metering pump 46 is positioned in branch delivery conduit 42, metering pump 47 is positioned in branch delivery conduit 43 and metering pump 48 is positioned in branch delivery conduit 44. Each metering pump includes its own variable speed metering pump motor 50, 51, and 52, respectively. The speed of operation of each metering pump is independently controlled.

Figure 5:
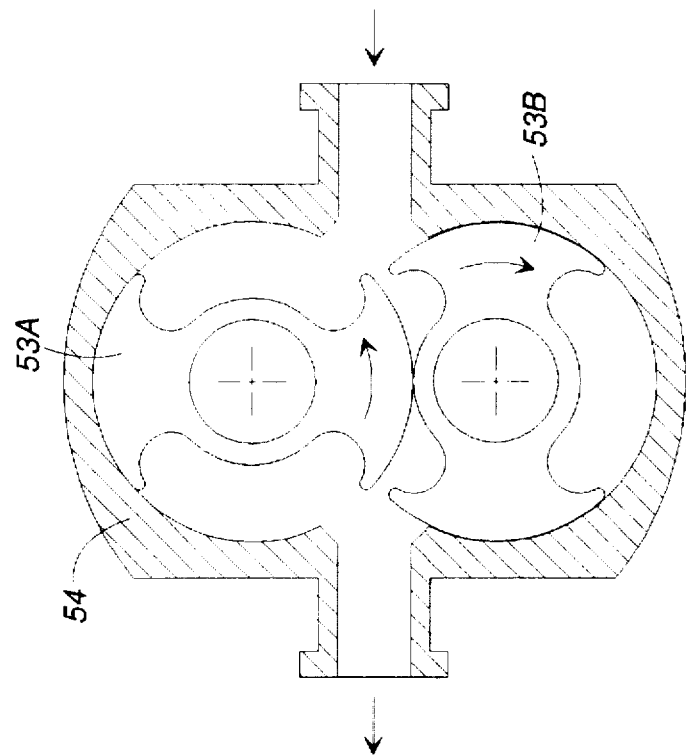
FIG. 5 is a side, cross-sectional view of a metering pump.

The metering pumps are of identical construction and are rotary piston, interference fit pumps that are positive displacement and which provide a constant delivery of dough therethrough. For example, FIG. 5 illustrates one of the metering pumps 46–48 which includes a pair of rotary pistons 53A and 53B that rotate in pump housing 54. The inner engagement of the rotary pistons causes a constant delivery of the dough from inlet to outlet. The pumps are known as constant delivery pumps which maintain a constant flow therethrough during the entire cycle of the rotary pistons therein. A brand of pump of this type which is suitable for use with this invention is Unibloc, produced by Flowtech, Inc. of Atlanta, Ga. Although a Unibloc rotary piston pump is specifically disclosed herein, other constant delivery pumps, such as Sine, Waukesha and Moyno pumps may be suitable for use since they also provide a substantially constant rate of delivery by volume of the dough moved from the pump module 10 through the dough divider module 12.

As shown in FIG. 2, dough divider 55 is mounted over and at the ends of the metering pumps 46–48. Dough divider 55 includes three dough divider blades 56 that are mounted at the ends of the branch dough conduits 42–44. A single drive motor 57 is used to oscillate all of the paddles 56 in unison downwardly across the exit opening of each branch conduit 42–44, and then retract upwardly for a repeat cycle. A typical dough divider is disclosed in more detail in U.S. Pat. No. 5,270,070. The dough divider operates with a continual and constant motion, so that its blades sweep downwardly at equal intervals so as to cut the incoming streams of dough from the branch dough conduits at equal time intervals. If the metering pumps are all adjusted so as to divide streams of dough at equal constant volume rates, the dough pieces being cut by the dough divider will be of equal volume.

As shown in FIG. 4, the rounder bar module 14 includes a surface conveyor 60 that extends away from the dough divider 55. A first set of rounder bars 61, 62 and 63 are arranged at an angle along the upper conveying surface of the conveyor 60, and the second set of rounder bars 65, 66 and 67 are arranged at a reverse angle adjacent the conveying surface of the surface conveyor 60. Rounder bars are disclosed in more detail in U.S. Pat. No. 4,306,850.

When the dough divider 55 separates the extruded ends of the streams of dough from the branch dough conduits 42–44, the dough pieces 70 fall to the surface of conveyor 60 and form columns of dough pieces 71, 72 and 73 that are moved by the surface conveyor 60 adjacent the first set of rounder bars 61–63, and then subsequently adjacent the second set of rounder bars 65–67. While moving adjacent the rounder bars, the dough pieces are rolled over so that they become ball shaped and the surfaces of the dough balls become more developed to form a skin that helps to retain gas in the dough mass and is less tacky than the dough in the center of the dough balls.

The dough balls are maintained in their separate columns and are moved through the flouring system 16 (FIG. 1). A flouring system is disclosed in U.S. Pat. No. 4,636,301.

After the dough balls have been floured, they are elevated by elevator 18 and each column of dough balls is then moved on a separate surface conveyor 20, 21 or 22 toward a sheeter-molder-panner such as sheeter-molder-panners 24 and 25.

Each sheeter-molder-panner includes a sheeter 75, a molder 76 and a panner 77. Sheeter 75 includes multiple pairs of parallel rolls that receive each dough ball and rotates so as to flatten the dough ball into a sheet of dough. The sheet of dough is then dropped from the sheeter 75 to the molder 76, which includes a surface conveyor that moves the sheet of dough against a stationary surface that causes the sheet of dough to roll into a spiral form, for subsequent baking into a loaf of bread or other elongated product. The elongated spiral sheeted dough piece then is dropped to a pan that is indexed through the panner 77. When a pan has been filled with the pieces of dough, the pan is indexed forwardly from the panner 77 so that an empty pan can be indexed beneath the molder 76, and the process continues. Sheeter-molder-panners are of conventional design.

OPERATION

The stuffing pump 30 (FIG. 2) operates so as to continuously move dough from the mass of dough in the hopper 28 to the developer 38, and the stuffing pump creates pressure in the dough. The motor 32 of the stuffing pump is a variable speed electric motor, and the speed of the motor responds to the pressure of the dough as detected by a pressure detector downstream of the stuffing pump, so as to maintain a positive control over the pressure of the dough exiting the stuffing pump. The desired constant pressure is 40 psi for the system disclosed herein. This pressure can be adjusted, if desired, by the machine operator.

The dough from the stuffing pump 30 moves through the dough developer 38 which agitates the dough so as to develop the gluten structure of the dough. The dough then emerges from the developer 38 through its single dough inlet conduit 40. The dough is then divided into multiple branch delivery conduits moving toward the dough divider 55. In the embodiment illustrated, the dough is divided into three branch dough delivery conduits 42–44, and the branch delivery conduits each include a metering pump 46–48. As previously stated, each metering pump 46, 47 and 48 independently controls the volume of dough moving through its branch delivery conduit 42–44. The speed of operation of each pump is individually adjustable by the machine operator, by adjusting the variable speed motor, 50, 51 or 52 for each pump 42, 43 or 44.

Usually, it is desirable that each dough piece developed by the system be of equal weight. Over the period of operation of the system, the dough received in the system may be at different stages of development, so that some of the dough may be of less density than some of the other dough. Inasmuch as the divider blades 56 of the dough divider 55 work on a constant time cycle, so that the blades sweep in unison across the openings of the branch dough conduits 42–44 at equal time intervals, a change in density of the dough being handled by the system will create a change in the weight of the dough balls separated by the dough divider from the oncoming streams of dough. In addition, different types of dough may be used in the system, so that the speed of operation of the metering pumps might require a change from one type of dough to another type of dough.

Typically, the machine operator will start up the machine and, once the machine is in operation, the operator takes several dough balls from each column of dough balls being delivered by the system and weighs the dough balls so as to determine their weight. If the weight of the dough balls is too high or too low, the operator simply adjusts the speed of operation of the motor of the metering pump, which will increase or decrease the volume of dough being moved through the dough divider 55. This will increase or decrease the weight of the dough balls being separated from the streams of dough by the dough divider.

An advantage of the system disclosed herein is that the operation of any one of the metering pumps can be adjusted independently of the operation of the other metering pumps, without disturbing the output of the other metering pumps. Also, another advantage of this system is that the operation of one of metering pumps can be terminated so as to terminate the delivery of dough balls through one of the branch conduits 42, 43 or 44, without interrupting the flow of dough through the other branch conduits. This enables the machine operator to maintain, repair or clean the system downstream of the terminated metering pump without interrupting the operation of the rest of the system. Even though the operation of one of the metering pumps 46–48 is terminated, the backpressure of dough upstream of all of the metering pumps is maintained at the desired operational pressure, usually 40 psi, by the pressure control system of the stuffing pump 30.

Further, since the system utilizes constant delivery pumps which deliver a constant volume of dough throughout a complete cycle of the pump, there will be no low or high points in the delivery of the dough through the dough divider 55, so that the dough divider can operate completely independently of the metering pumps, with the dough divider operating on a continuous constant cycle even though the operation of the metering pumps 46–48 may be out of cycle with one another.

While a preferred embodiment of the invention has been disclosed in detail in the foregoing description and drawings, it will be understood by those skilled in the art that variations and modifications thereof can be made without departing from the spirit and scope of the invention as set forth in the following claims.

We claim:

1. In a baker's dough processing system for delivering pieces of dough in equally spaced series and in parallel paths to a rounder bar surface conveyor system including a surface conveyor for progressively receiving columns of dough pieces, the improvement therein of:

a stuffing pump for receiving a mass of dough and increasing the pressure of the dough to a predetermined constant pressure;

dough delivery conduit means including an inlet conduit arranged to receive dough from said stuffing pump and a plurality of dough delivery conduits to receive dough from said inlet conduit and to move the dough in continuous separate streams of dough;

a metering pump for each dough delivery conduit positioned downstream of a dough developer in communication with each dough delivery conduit and arranged to separately control the rate of flow of dough through each of said dough delivery conduits;

a dough divider downstream of said metering pumps and including divider blade means for severing each stream of dough extruded from said dough delivery conduits into separate columns of dough pieces and to deliver the dough pieces of each stream of dough onto a rounder bar surface conveyor arranged for progressively receiving the lines of dough pieces and rounding said dough pieces into dough balls;

said metering pumps each being individually adjustable to increase or decrease the volume of dough moving through said dough delivery conduit means over a period of time.

2. The system of claim 1 and wherein said dough divider includes a separate blade for each dough delivery conduit means.

3. The system of claim 1 and wherein said metering pumps each comprise a constant volume pump.

4. The system of claim 3 and wherein said constant volume metering pumps each comprise two double lobe interference rotor pumps.

5. The system of claim 1 and wherein the dough developer arranged for receiving dough from said stuffing pump and developing the dough and delivering the dough to the inlet conduit of said dough delivery conduit means.

6. A multiple lane bread divider for delivering baker's dough from a mass of dough in a series of dough balls in parallel columns along a processing path through a plurality of dough processing stations to sheeter-molder-panners comprising:

a stuffing pump for moving dough from the mass of dough at a predetermined constant pressure;

dough conduit means for receiving a continuous stream of dough from said stuffing pump, said conduit means diverging into a plurality of branch delivery conduits for delivering the dough in separate continuous streams of dough;

a constant volume dough metering pump in each branch delivery conduit for adjustably controlling the rate of movement of dough through each branch delivery conduit;

dough divider means downstream of said metering pumps for receiving continuous streams of dough in parallel paths from all of said branch delivery conduits, and including blade means for continually dividing the streams of dough at equal time intervals into dough pieces;

a rounder bar conveyor positioned downstream of said dough divider means and including a surface conveyor positioned to receive the dough pieces and form the dough pieces into dough balls and to move the dough balls in columns along the processing path; and a sheeter-molder-panner for each column of dough balls and arranged to receive each column of dough balls from said rounder bar conveyor and to reform the dough balls;

whereby the dough balls move in separate columns from said dough divider means to each of said sheeter-molder-panners.

7. A method of delivering baker's dough from a mass of dough in parallel paths of dough balls to separate sheeter-molder-panners of a dough processing system, comprising the steps of:

pumping the dough from a supply of dough with a stuffing pump in a single stream of dough;

diverting the single stream of dough into multiple continuous streams of dough;

passing each multiple stream of dough through a metering pump;

controlling with each metering pump the volume of dough passing through each metering pump;

dividing each stream of dough passed through the metering pumps into a series of dough pieces in separate columns of dough pieces;

moving each column of dough pieces separately along a processing path toward a sheeter-molder-panner;

weighing the dough pieces of each parallel processing path; and adjusting the speed of operation of the metering pumps in response to the weighing of the dough pieces as necessary to deliver pieces of dough of equal weight in each processing path to the sheeter-molder-panners.

8. The method of claim 7 and further including the step of terminating the operation of one of the metering pumps while the other metering pumps continue to operate.

* * * * *

UNITED STATES PATENT AND TRADEMARK OFFICE
CERTIFICATE OF CORRECTION

PATENT NO.  : 5,750,169
DATED       : May 12, 1998
INVENTOR(S) : Jackie Lee Rose, et. al.

It is certified that error appears in the above-identified patent and that said Letters Patent is hereby corrected as shown below:

Title page, under item [56], insert the following references:

U. S. PATENT DOCUMENTS

| EXAMINER INITIAL | PATENT NUMBER | ISSUE DATE | PATENTEE | CLASS | SUBCLASS | FILING DATE IF APPROPRIATE |
|---|---|---|---|---|---|---|
| | 4 3 0 6 8 5 0 | 12/22/81 | Cummins | | | |
| | 4 6 3 6 3 0 1 | 01/13/87 | Laramore | | | |
| | | | | | | |

Signed and Sealed this

Ninth Day of February, 1999

Attest:

Attesting Officer

*Acting Commissioner of Patents and Trademarks*